Nov. 6, 1951 S. W. JORDAN 2,574,214
STRAIGHT BEAM ADJUSTABLE JAW CLAMP AND SPREADER
Filed March 22, 1948 2 SHEETS—SHEET 1
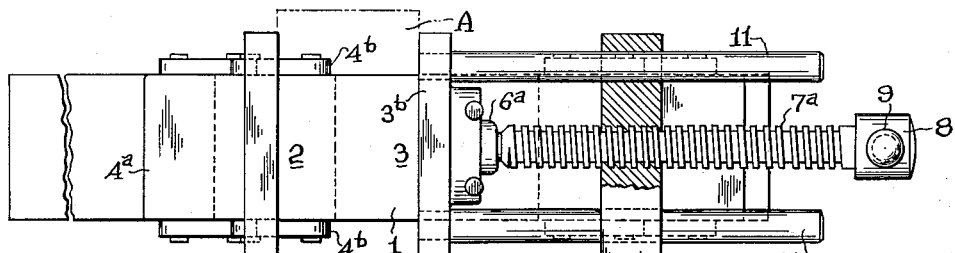
Fig. 2
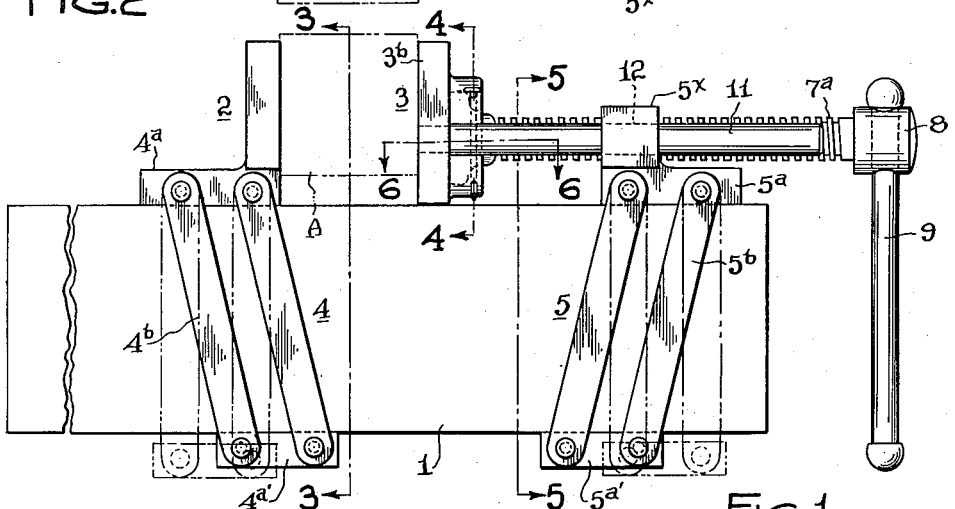
Fig. 1
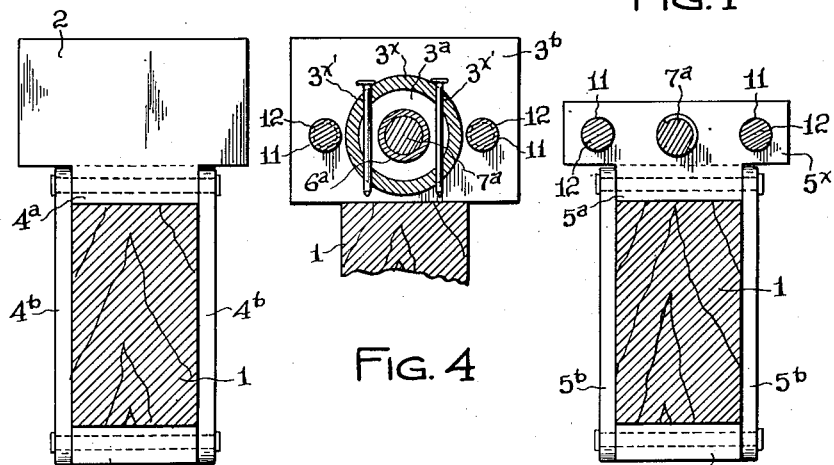
Fig. 3
Fig. 4
Fig. 5
INVENTOR.
SIDNEY W. JORDAN
BY
Geo. B. Pitts
ATTORNEY.

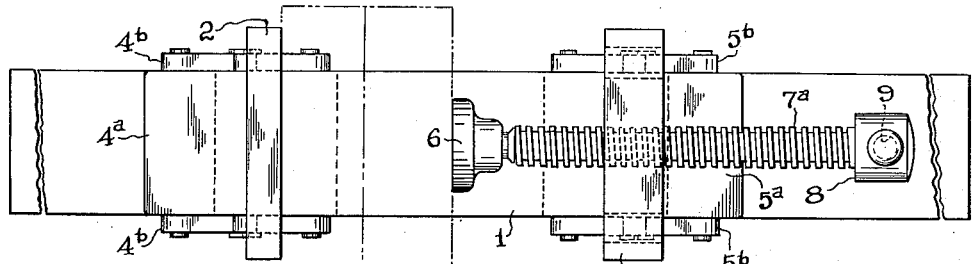
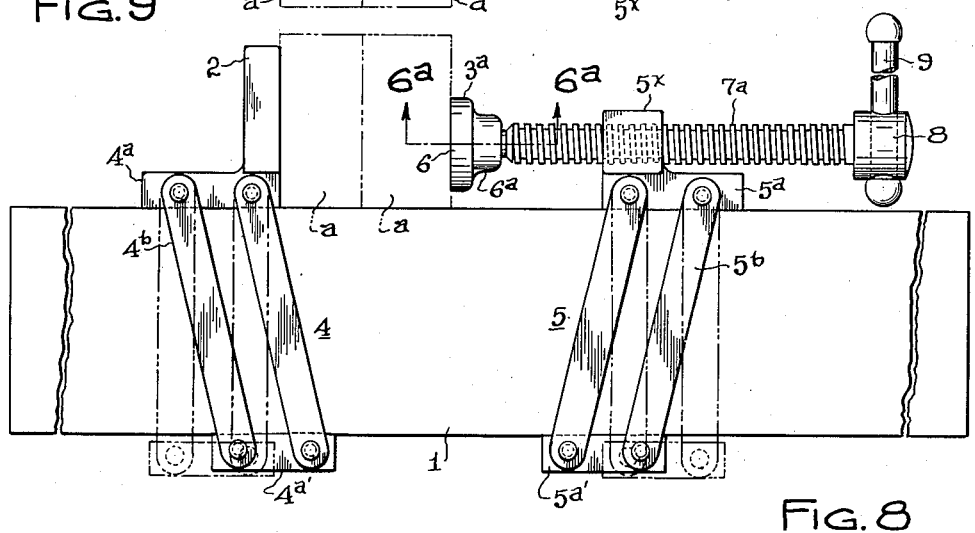
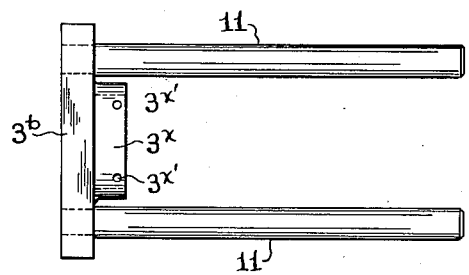
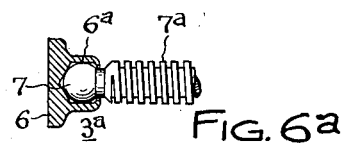
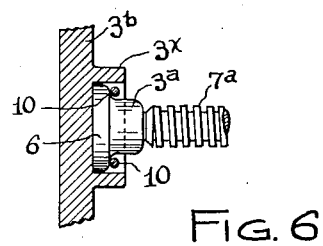
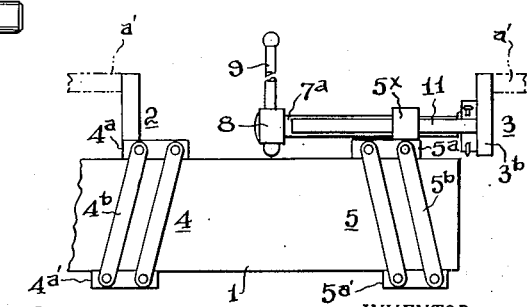

Patented Nov. 6, 1951

2,574,214

UNITED STATES PATENT OFFICE 2,574,214

STRAIGHT BEAM ADJUSTABLE JAW CLAMP AND SPREADER

Sidney William Jordan, Sheffield Lake, Ohio

Application March 22, 1948, Serial No. 16,204

1 Claim. (Cl. 144—303)

This invention relates to an equipment or mechanism for use in carrying out various manual operations wherein pressure is to be applied to two or more parts, either to affect compression thereof or movement of one part away from another part, or rigidly hold two parts in spaced relation, or two or more parts are to be held together in assembled relation or a work piece is to be rigidly supported while being worked on or treated; the equipment being especially adapted for applications where the work piece or assembly may vary largely in its dimensions. More particularly the invention relates to a mechanism having work engaging members, one of which is operatively connected to a feed screw threaded through the wall of a device mounted on an elongated bar, the other member being connected to a separate device mounted on the bar and at least one of said devices having adjustable engagement with the bar.

One object of the invention is to provide an improved mechanism of this character wherein the supporting device for one work engaging member and the supporting device for the feed screw, which is operatively connected to the other work engaging member, are independently mounted on a bar, one of said devices consisting of pressure members engaging opposite outer sides of the bar in offset relation, whereby the pressure members may be initially secured to the bar and locked thereto under increased pressure in proportion to the pressure applied by the feed screw in operating the adjacent work engaging member.

Another object of the invention is to provide an improved mechanism of this character having relatively movable work engaging members and means for moving one of said members toward or from the other member, said members being mounted on a support along which either one of said members may be adjustably secured to the support without the use of securing devices to position the work engaging members in position for engaging work under pressure.

Another object of the invention is to provide an improved mechanism of this character having relatively movable work engaging members and means for moving one of said members toward or from the other member and separate supports for said members slidably mounted on a bar, one of said supports consisting of connected together relatively movable pressure members adjustably engaging opposite outer sides of the bar to position the adjacent work engaging member in spaced relation to the other work engaging member, whereby the work engaging members and work may be related and clamped by the latter.

Another object of the invention is to provide an improved mechanism of this character of simple construction having work engaging members adapted to be positioned in operative relation to work of varying sizes without the use of securing devices and the work clamped thereby.

Another object of the invention is to provide an improved mechanism of this character having relatively movable work engaging members, one of the members being provided with an auxiliary removable work engaging member, whereby the mechanism may be adapted to a wide range of work.

Another object of the invention is to provide an improved mechanism of this character having realtively movable work engaging members sepnarately connected to supporting devices which are relatively movable on an elongated support, whereby the work engaging members may be positioned in relation to work of varying sizes.

Another object of the invention is to provide an improved mechanism of this character adapted to be used as a vise for a work piece or as a clamp to hold a plurality of pieces of work in assembled relation.

Another object of the invention is to provide an improved mechanism of this character wherein the work engaging members are so mounted that they may be mounted to engage work between them under pressure or mounted between two spaced work pieces and engage them under pressure.

Other objects of the invention will be apparent to those skilled in the art to which my invention relates from the following description taken in connection with the accompanying drawings, wherein:

Fig. 1 is a side view of a mechanism embodying my invention and engaging a work piece.

Fig. 2 is a top plan view.

Figs. 3, 4, 5, and 6 are sections on the line 3—3, 4—4, 5—5 and 6—6, respectively, of Fig. 1.

Fig. 6a is a section on the line 6a—6a of Fig. 8.

Fig. 7 is a plan view of the auxiliary work engaging member.

Fig. 8 is a side elevation of the mechanism with the auxiliary work engaging member removed and clamping two pieces of work together.

Fig. 9 is a top plan view of the parts shown in Fig. 8.

Fig. 10 is a fragmentary side elevation showing the parts in a different relation.

In the drawings, referring to Figs. 1 to 6, inclusive, 1 indicates an elongated support relative to which either or both work engaging members 2, 3, are bodily movable. The support 1 may be of any desired length. It will be understood that one work engaging member may be suitably secured to the support and the other work engaging member mounted on the support to be bodily moved thereon to relate the members in position to engage work under pressure, but in the preferred form of construction both members are bodily relatively movable on the support 1, the member 2 being connected to adjustable devices, indicated as an entirety at 4, and the member 3 being connected to adjustable devices, indicated as an entirety at 5. The adjustable devices 4, 5, engage the support 1 and are separately movable endwise thereof, whereby the work engaging members 2, 3, may be spacedly related to receive work between them and then one thereof fed toward the other member, independently of the devices 4, 5, to rigidly clamp a work piece A between them.

The devices 4 consist of a pair of pressure members 4a, 4a', arranged to movably engage the upper and lower sides of the member 1 and connected together at opposite sides of the support 1 by links 4b, the length of which is greater than the vertical height of the support 1, and pivotally connected at their opposite ends to the members 4a, 4a'. Accordingly, by vertically offsetting the pressure members 4a, 4a', one relative to the other in the plane of the support 1, as shown in Figs. 1 and 2, they are engaged face-to-face with upper and lower walls of the support 1 and frictionally secured thereto; and in such position, clamping of the work piece A serves to rigidly connect the pressure members 4a, 4a'. By moving the pressure member 4a' to its dotted line position (Fig. 1), the pressure members 4a, 4a', are released from the support 1 and may be readily adjusted to another position on the latter. Due to the fact that the work engaging member 3 is adjustable relative to the devices 5 toward and from the member 2, the latter is formed integral with and disposed at right angles to the pressure member 4a. By preference, two links 4b are connected to the pressure members 4a, 4a', at each side of the support 1, so that the pressure members are at all times disposed in parallel relation to facilitate the adjustment of the members, to or from their offset relation and along the support 1.

The devices 5 consist of upper and lower pressure members 5a, 5a', connected together at opposite sides of the support 1 by parallel links 5b. Accordingly, the devices 5 operate and may be adjusted endwise of the support 1 and secured thereto similarly to the devices 4. The work engaging member 3 is movably connected to the pressure member 5a, whereby it may be moved relative to the devices 5 endwise of the support to secure or clamp work between it and the member 2. The work engaging member 3 consists of a main member 3a and a removable auxiliary member 3b. The main work engaging member 3a consists of a head 6 having a rearwardly extending annular wall 6a, the outer end of which is peened over to loosely and rotatably engage the rear side of a substantially spherical element 7 on the outer end of a feed screw 7a (Fig. 6a). The feed screw 7a extends rearwardly and is threaded through a screw threaded opening formed in a cross bar 5x fixed to the pressure member 5a, the outer end of the feed screw being provided with a fitting 8 formed with a through opening at right angles to the axis of the feed screw 7a to accommodate a handle 9. The auxiliary work engaging member 3b is removably connected to the main member 3a and moves therewith, when the feed screw is rotated in either direction. The member 3b is disposed in front of the head 6 so as to co-act with the member 2 and is provided on its inner side with an integral annular wall 3x, which extends rearwardly of the head 6 into surrounding relation to the annular wall 6a thereon. At opposite sides of the wall 6a and rearwardly of the head 6 the wall 3x is formed with pairs of alined openings 3x' to removably receive pins 10. The axes of the openings 3x' are parallelly related and arranged to support the pins 10 in engagement with the rear side of the head 6. By preference, the openings 3x' extend vertically and the pins 10 are provided with heads. The pins 10 may consist of nails or the like. For the purpose of maintaining the auxiliary member 3b in fixed relation to the head 6 and prevent it from rotating about the latter I provide thereon a pair of rearwardly extending guide rods 11, 11, in diametrical relation, the rods 11 being suitably fixed to the member 3b and slidably fitting openings 12 formed in the cross bar 5x. With the parts assembled as above described it will be noted that the members 3a, 3b, are moved as a unit in either direction when the feed screw 7a is operated.

As shown in Figs. 1 and 2, the mechanism may be employed as a vise. When the auxiliary member 3b is removed the work engaging members 2 and 3a may be employed as a clamp, as shown in Figs. 8 and 9, to secure work pieces a, a, in assembled relation. To remove the auxiliary member 3b, the pins 10 are first removed and thereafter the member 3a is backed away from the member 3b until the outer ends of the rods 11 clear the openings 12 in the cross bar 5x.

It will be observed that the devices 4, 5, may be reversely mounted on the support 1; that is, instead of the work engaging members 2, 3, or 2, 3a, being in opposed relation, as shown in Figs. 1 and 8 and the devices 4, 5, positioned to resist compression by operation of the feed screw, the members 2, 3, and devices 4, 5, may be reversely related and the devices positioned to resist expansion, the work engaging members serving to spread two work pieces a', a' (see Fig. 10), either to effect compression on one piece which is held against an abutment or to secure two parts in spaced relation and against suitable abutments, upon operation of the feed screws 7a. When the devices 4, 5, are mounted as shown in Fig 10, the auxiliary work engaging member 3b or the main work engaging member 3a may be employed depending upon the work to be engaged.

It will be observed that the devices 4, 5, may be relatively spaced any desired distance dependent upon the length of the support 1 which may be formed of wood. Where the support 1 is formed of metal, its top and bottom walls may be suitably roughened to insure a grip of the pressure members therewith; if found desirable the inner faces of the pressure members may also be roughened. In my form of construction, while the devices 4 and 5 are independently adjustable on the support, such adjustment or adjustments are effected readily and quickly and do not require the use of tools, removal or replacement of bolts or screws; also, while the pressure of the pressure members on the support is increased in proportion to the force applied to the work, the work engaging members, upon the disengagement thereof from the work, either or both devices 4, 5, may be readily released from the support 1 and adjusted to another position. The pivot pins for connecting the links 4b and 5b to the adjacent pressure members, respectively, may consist of bolts to facilitate assembly, removal and/or reversal of the parts on the support 1.

To those skilled in the art to which my invention relates, many changes in construction and widely differing embodiments and applications thereof will be apparent without departing from the scope of the invention. My disclosures and the description herein are purely illustrative and are not intended in any sense to be limiting.

What I claim is:

In mechanism of the class described, the combination of an elongated support, separate devices separately adjustably mounted on said support, each device consisting of a pair of pressure members movably related to the upper and lower faces of said support and arranged to frictionally engage said faces, pairs of links interconnecting said pressure members at opposite sides thereof, said links being of equal length and having a length greater than the spacing of said faces to permit movement of one pressure member into offset relation to the other pressure member and in engagement with the adjacent face, a work engaging member connected to one of said upper face engaging pressure members, a work engaging member in opposed relation to said first mentioned work engaging member, a cross member connected to the other upper face engaging pressure member and formed with a screw threaded opening and guide openings at opposite sides of said screw threaded opening, said last mentioned work engaging member consisting of a main member and an auxiliary member removably engaging said main member, said auxiliary member being provided with rearwardly extending rods slidable endwise in said guide openings, and a feed screw extending through said screw threaded opening and connected at its inner end to said main member.

SIDNEY WILLIAM JORDAN.

REFERENCES CITED

The following references are of record in the file of this patent:

UNITED STATES PATENTS

| Number | Name | Date |
|---|---|---|
| 131,195 | Traut | Sept. 10, 1872 |
| 292,391 | Weiser | Jan. 22, 1884 |
| 359,942 | Shaw | Mar. 22, 1887 |
| 418,847 | Liefer | Jan. 7, 1890 |
| 754,962 | Bennett | Mar. 22, 1904 |
| 946,140 | Knoke | Jan. 11, 1910 |
| 982,064 | Horsman | Jan. 17, 1911 |
| 1,120,466 | Fegley et al. | Dec. 8, 1914 |
| 1,403,580 | Venema | Jan. 17, 1922 |
| 1,442,076 | Koll | Jan. 16, 1923 |

FOREIGN PATENTS

| Number | Country | Date |
|---|---|---|
| 127,330 | Switzerland | Aug. 16, 1928 |